US012626198B2

(12) United States Patent　　(10) Patent No.:　US 12,626,198 B2

Gollhofer et al.　　(45) Date of Patent:　May 12, 2026

(54) SYSTEMS AND METHODS FOR USING GENERATIVE ARTIFICIAL INTELLIGENCE WITH AGILE PROJECT MANAGEMENT

(71) Applicant: BNSF Railway Company, Fort Worth, TX (US)

(72) Inventors: Phillip J. Gollhofer, Fort Worth, TX (US); Dinesh A. Velhal, Argyle, TX (US)

(73) Assignee: BNSF Railway Company, Fort Worth, TX (US)

( * ) Notice: Subject to any disclaimer, the term of this patent is extended or adjusted under 35 U.S.C. 154(b) by 0 days.

(21) Appl. No.: 18/883,296

(22) Filed: Sep. 12, 2024

(65) Prior Publication Data

US 2026/0073316 A1　　Mar. 12, 2026

(51) Int. Cl.
*G06Q 10/00*　　(2023.01)
*G06Q 10/063*　　(2023.01)
*H04L 51/02*　　(2022.01)

(52) U.S. Cl.
CPC ........... *G06Q 10/063* (2013.01); *H04L 51/02* (2013.01)

(58) Field of Classification Search
None
See application file for complete search history.

(56) References Cited

U.S. PATENT DOCUMENTS

| | | | |
|---|---|---|---|
| 7,433,852 B1 | 10/2008 | Bertrand et al. | |
| 10,073,923 B2 | 9/2018 | Koren et al. | |

| | | | |
|---|---|---|---|
| 11,062,271 B2 | 7/2021 | Nelson et al. | |
| 11,144,289 B1 | 10/2021 | Hwang et al. | |
| 11,275,565 B2 | 3/2022 | Bodin et al. | |
| 11,449,366 B2 | 9/2022 | Patel et al. | |
| 11,501,255 B2 | 11/2022 | Mann et al. | |
| 11,709,765 B1 | 7/2023 | Raja et al. | |

(Continued)

FOREIGN PATENT DOCUMENTS

| | | |
|---|---|---|
| CN | 116595993 A | 8/2023 |
| CN | 117130595 A | 11/2023 |

(Continued)

OTHER PUBLICATIONS

Nadarzynski, Tom, Acceptability of artificial intelligence (AI)-led chatbot services in healthcare: A mixed-methods study, 2019, Digital Health, vol. 5: 1-12, p. 1-12. (Year: 2019).*

*Primary Examiner* — Joseph M Waesco
(74) *Attorney, Agent, or Firm* — Whitaker Chalk Swindle & Schwartz PLLC; Enrique Sanchez, Jr.

(57)　　　ABSTRACT

A method for using artificial intelligence (AI) with agile project management (APM) includes accessing an APM user story, a plurality of an AI chatbot prompts, and a plurality of large language model (LLM) parameters. The APM user story includes a user description of a unit of work. The method further includes electronically transmitting, to an AI chatbot across a communications network, the APM user story, the plurality of AI chatbot prompts, and the LLM parameters. The method further includes electronically receiving, across the communications network, an APM AI response generated by the AI chatbot using the APM user story, the plurality of AI chatbot prompts, and the LLM parameters. The method further includes displaying the APM AI response generated by the AI chatbot on an electronic display.

14 Claims, 12 Drawing Sheets

190

STORY (B-333942) ANALYSIS (DEEP DIVE)

870　　880

STORY (B-333942)　LLM PARAMETERS　PROMPTS

Show [25 ∨] entries　820　830　840　Search: [＿＿＿＿]

310　420　　　　　850　860

| Story # | Story Title | Analysis Type | Response Time (seconds) | Prompt Tokens | Response Tokens | Status |
|---|---|---|---|---|---|---|
| 810A B-333942 | UI: Add Train in Train Option to Actions Dropdown | REVIEW | 5.293 | 438 | 96 | SUCCESS |
| 810B B-333942 | UI: Add Train in Train Option to Actions Dropdown | REWRITE | 7.276 | 429 | 205 | SUCCESS |
| 810C B-333942 | UI: Add Train in Train Option to Actions Dropdown | GENERATE TESTS | 22.487 | 617 | 387 | SUCCESS |
| 810D B-333942 | UI: Add Train in Train Option to Actions Dropdown | TESTING TIPS | 11.16 | 425 | 183 | SUCCESS |

Showing 1 to 4 of 4 entries　　　　　Previous [1] Next

(56)     References Cited

U.S. PATENT DOCUMENTS

| | | | |
|---|---|---|---|
| 11,799,924 B2 | 10/2023 | Beaver et al. | |
| 11,983,228 B1 * | 5/2024 | Swope | G06F 16/951 |
| 2020/0403944 A1 * | 12/2020 | Joshi | G06F 16/2365 |
| 2021/0012288 A1 | 1/2021 | Mroczka | |
| 2021/0241866 A1 | 8/2021 | Bhattacharya et al. | |
| 2021/0279577 A1 | 9/2021 | West et al. | |
| 2021/0297531 A1 * | 9/2021 | Karp | G06F 9/547 |
| 2023/0185997 A1 | 6/2023 | Hakimi et al. | |
| 2023/0298477 A1 | 9/2023 | Krasley | |
| 2023/0342721 A1 | 10/2023 | Langham | |
| 2024/0356871 A1 * | 10/2024 | Brewer | H04L 51/04 |
| 2024/0380711 A1 * | 11/2024 | Lai | G06Q 50/205 |
| 2024/0419706 A1 * | 12/2024 | Gutierrez | G06F 40/166 |
| 2025/0005269 A1 * | 1/2025 | Ahmed | G06F 40/186 |
| 2025/0150414 A1 * | 5/2025 | Mikhailiuk | H04L 51/063 |

FOREIGN PATENT DOCUMENTS

| | | | |
|---|---|---|---|
| CN | 117193745 A | 12/2023 | |
| CN | 117289905 A | 12/2023 | |
| CN | 117370190 A | 1/2024 | |
| WO | 2019136178 A1 | 7/2019 | |
| WO | 2023165073 A1 | 9/2023 | |

* cited by examiner

Figure 2:
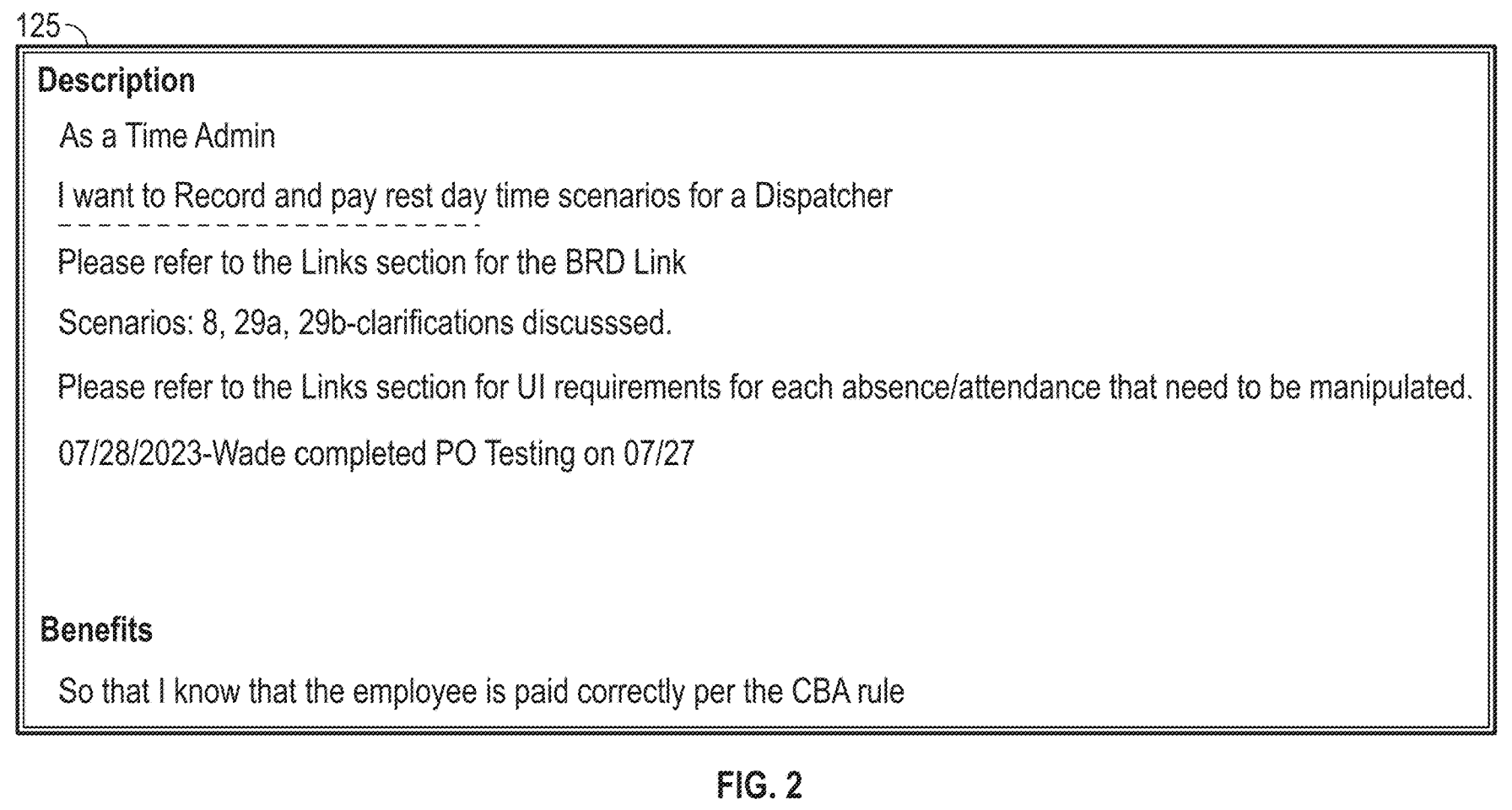

Description

As a Time Admin

I want to Record and pay rest day time scenarios for a Dispatcher

Please refer to the Links section for the BRD Link

Scenarios: 8, 29a, 29b-clarifications discusssed.

Please refer to the Links section for UI requirements for each absence/attendance that need to be manipulated.

07/28/2023-Wade completed PO Testing on 07/27

Benefits

So that I know that the employee is paid correctly per the CBA rule

| # | TITLE | ANALYSIS TYPE | STATUS |
|---|---|---|---|
| B-315901 | 320 REST DAY_TIME | REVIEW | SUCCESS |

310
320
330
340

- STORY ID: B-315901
- STORY TITLE: REST DAY_TIME
- RATING: 4
- DETAILED REASONING BEHIND THE RATING:
    - SUCCESS CRITERIA WITH A LEVEL OF DETAILS: THE STORY LACKS SPECIFIC SUCCESS CRITERIA. IT MENTIONS RECORDING AND PAYING REST DAY TIME SCENARIOS FOR A DISPATCHER BUT DOES NOT DETAIL WHAT CONSTITUTES A SUCCESSFUL IMPLEMENTATION. (1/3)
    - FLOW, CLARITY, GRAMMAR, SPELLINGS: THE STORY IS BRIEF AND TO THE POINT, BUT IT LACKS CLARITY DUE TO THE ABSENCE OF DETAILED DESCRIPTIONS OR ACCEPTANCE CRITERIA. GRAMMAR AND SPELLING ARE CORRECT. (2/3)
    - NFR'S PRESENT: THERE IS NO MENTION OF NON-FUNCTIONAL REQUIREMENTS (NFRS), WHICH ARE CRITICAL FOR UNDERSTANDING THE PERFORMANCE, USABILITY, AND OTHER SYSTEM QUALITIES. (0/2)
    - ATTACHMENTS AND EXAMPLES FOR CLARITY: THE STORY REFERENCES LINKS TO A BUSINESS REQUIREMENTS DOCUMENT (BRD) AND UI REQUIREMENTS BUT DOES NOT INCLUDE THEM DIRECTLY. WITHOUT THESE ATTACHMENTS OR EXAMPLES, IT'S DIFFICULT TO ASSESS THE COMPLETENESS OF THE STORY. (1/2)

350

- SUGGESTIONS FOR IMPROVEMENT:
    - INCLUDE SPECIFIC SUCCESS CRITERIA AND ACCEPTANCE TESTS TO CLEARLY DEFINE WHAT "RECORD AND PAY REST DAY TIME SCENARIOS" ENTAILS. THIS SHOULD DETAIL THE EXACT FUNCTIONALITY THAT THE TIME ADMIN SHOULD BE ABLE TO PERFORM.
    - ADD A SECTION FOR NON-FUNCTIONAL REQUIREMENTS TO COVER ASPECTS SUCH AS PERFORMANCE, SECURITY, AND USABILITY.
    - DIRECTLY INCLUDE OR ATTACH THE RELEVANT SECTIONS FROM THE BRD AND UI REQUIREMENTS TO THE USER STORY FOR EASIER REFERENCE AND TO PROVIDE CONTEXT.
    - PROVIDE EXAMPLES OR SCENARIOS THAT ILLUSTRATE THE EXPECTED BEHAVIOR OF THE SYSTEM WHEN HANDLING REST DAY TIME FOR A DISPATCHER.
    - CLARIFY THE MEANING OF "SCENARIOS: 8, 29A, 29B CLARIFICATIONS DISCUSSED." IT IS NOT CLEAR WHETHER THESE SCENARIOS ARE INCLUDED IN THE STORY OR IF THEY ARE PENDING DISCUSSION. INCLUDE THE OUTCOMES OF ANY DISCUSSIONS IF THEY HAVE ALREADY TAKEN PLACE.
    - THE NOTE ABOUT WADE COMPLETING PO TESTING IS OUT OF PLACE IN THE STORY DESCRIPTION. IT SHOULD BE PART OF THE STORY'S HISTORY OR COMMENTS SECTION, NOT THE DESCRIPTION.

| # | TITLE | ANALYSIS TYPE | STATUS |
|---|---|---|---|
| B-315901 | REST DAY_TIME | REWRITE | SUCCESS |

STORY NUMBER: B-315901

STORY TITLE: IMPLEMENTATION OF REST DAY TIME RECORDING AND PAYMENT FOR DISPATCHERS

DESCRIPTION:
THE PURPOSE OF THIS STORY IS TO ENABLE TIME ADMINISTRATORS TO ACCURATELY RECORD AND PROCESS PAYMENT FOR REST DAY TIME SCENARIOS SPECIFIC TO DISPATCHERS. THIS FUNCTIONALITY IS CRUCIAL TO ENSURE THAT DISPATCHERS ARE COMPENSATED CORRECTLY FOR REST DAYS ACCORDING TO THE OPERATIONAL GUIDELINES AND LABOR AGREEMENTS. THE SYSTEM MUST SUPPORT VARIOUS SCENARIOS THAT MAY OCCUR ON A DISPATCHER'S REST DAY, INCLUDING BUT NOT LIMITED TO OVERTIME, CALL-BACKS, AND DIFFERENT TYPES OF LEAVE.

DEPENDENCIES:
- THIS STORY IS DEPENDENT ON THE COMPLETION OF THE USER INTERFACE DESIGN FOR ABSENCE AND ATTENDANCE MANIPULATION AS SPECIFIED IN THE LINKED UI REQUIREMENTS DOCUMENT.
- INTEGRATION WITH THE PAYROLL SYSTEM FOR PROCESSING PAYMENTS.
- ACCESS TO DISPATCHER'S SCHEDULES AND ATTENDANCE RECORDS.

SUCCESS CRITERIA:
1. THE SYSTEM MUST ALLOW TIME ADMINISTRATORS TO RECORD REST DAY SCENARIOS FOR DISPATCHERS AS OUTLINED IN SCENARIOS 8, 29A, AND 29B.
2. THE SYSTEM MUST CORRECTLY CALCULATE THE PAYMENT AMOUNT FOR EACH REST DAY SCENARIO IN ACCORDANCE WITH THE PREDEFINED RULES AND AGREEMENTS.
3. THE SYSTEM MUST PROVIDE A USER INTERFACE THAT ALIGNS WITH THE UI REQUIREMENTS DOCUMENT LINKED IN THE LINKS SECTION.
4. THE SYSTEM MUST UPDATE THE DISPATCHER'S ATTENDANCE RECORDS ACCURATELY TO REFLECT THE REST DAY TIME RECORDED.
5. THE SYSTEM MUST INTEGRATE SEAMLESSLY WITH THE PAYROLL SYSTEM TO ENSURE CORRECT PAYMENT PROCESSING WITHOUT MANUAL INTERVENTION.
6. THE SYSTEM MUST LOG ALL ACTIONS TAKEN BY TIME ADMINISTRATORS FOR AUDIT AND TRACKING PURPOSES.
7. THE SYSTEM MUST HANDLE ERRORS GRACEFULLY AND PROVIDE MEANINGFUL ERROR MESSAGES TO THE TIME ADMINISTRATORS.

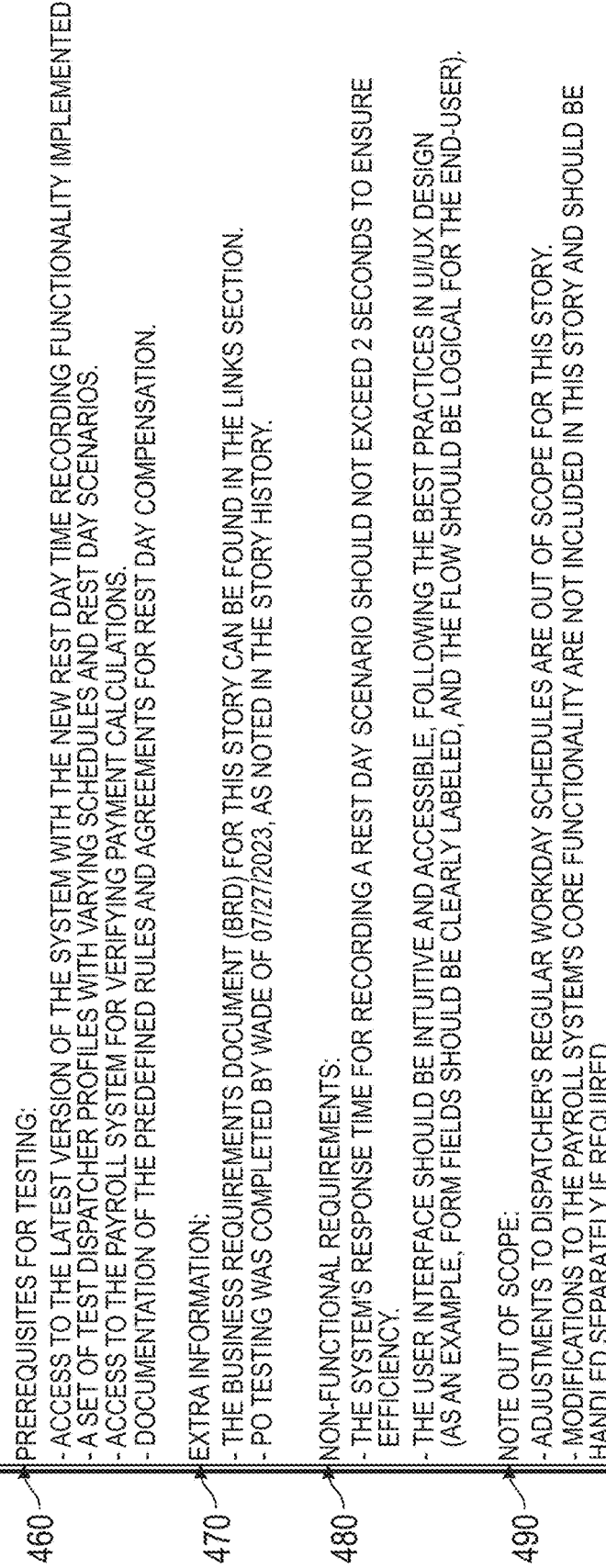

PREREQUISITES FOR TESTING:
- ACCESS TO THE LATEST VERSION OF THE SYSTEM WITH THE NEW REST DAY TIME RECORDING FUNCTIONALITY IMPLEMENTED.
- A SET OF TEST DISPATCHER PROFILES WITH VARYING SCHEDULES AND REST DAY SCENARIOS.
- ACCESS TO THE PAYROLL SYSTEM FOR VERIFYING PAYMENT CALCULATIONS.
- DOCUMENTATION OF THE PREDEFINED RULES AND AGREEMENTS FOR REST DAY COMPENSATION.

EXTRA INFORMATION:
- THE BUSINESS REQUIREMENTS DOCUMENT (BRD) FOR THIS STORY CAN BE FOUND IN THE LINKS SECTION.
- PO TESTING WAS COMPLETED BY WADE OF 07/27/2023, AS NOTED IN THE STORY HISTORY.

NON-FUNCTIONAL REQUIREMENTS:
- THE SYSTEM'S RESPONSE TIME FOR RECORDING A REST DAY SCENARIO SHOULD NOT EXCEED 2 SECONDS TO ENSURE EFFICIENCY.
- THE USER INTERFACE SHOULD BE INTUITIVE AND ACCESSIBLE, FOLLOWING THE BEST PRACTICES IN UI/UX DESIGN (AS AN EXAMPLE, FORM FIELDS SHOULD BE CLEARLY LABELED, AND THE FLOW SHOULD BE LOGICAL FOR THE END-USER).

NOTE OUT OF SCOPE:
- ADJUSTMENTS TO DISPATCHER'S REGULAR WORKDAY SCHEDULES ARE OUT OF SCOPE FOR THIS STORY.
- MODIFICATIONS TO THE PAYROLL SYSTEM'S CORE FUNCTIONALITY ARE NOT INCLUDED IN THIS STORY AND SHOULD BE HANDLED SEPARATELY IF REQUIRED.

| # | TITLE | ANALYSIS TYPE | STATUS |
|---|-------|---------------|--------|
| B-315901 | REST DAY_TIME | GENERATE TESTS | SUCCESS |

POSITIVE TEST CASES

SUCCESS CRITERION 1: RECORD REST DAY SCENARIOS
1. VERIFY THAT THE SYSTEM ALLOWS TIME ADMINISTRATORS TO RECORD A REST DAY FOR A DISPATCHER AS PER SCENARIO 8.
3. VERIFY THAT THE SYSTEM ALLOWS TIME ADMINISTRATORS TO RECORD A REST DAY FOR A DISPATCHER AS PER SCENARIO 29A.
2. VERIFY THAT THE SYSTEM ALLOWS TIME ADMINISTRATORS TO RECORD A REST DAY FOR A DISPATCHER AS PER SCENARIO 29B.
4. VERIFY THAT THE SYSTEM ALLOWS RECORDING OF MULTIPLE REST DAY SCENARIOS FOR A SINGLE DISPATCHER.
5. VERIFY THAT THE SYSTEM ALLOWS RECORDING OF REST DAY SCENARIOS FOR MULTIPLE DISPATCHERS.

SUCCESS CRITERION 2: CALCULATE PAYMENT AMOUNT
1. VERIFY THAT THE SYSTEM CALCULATES THE CORRECT PAYMENT FOR A REST DAY SCENARIO 8.
2. VERIFY THAT THE SYSTEM CALCULATES THE CORRECT PAYMENT FOR A REST DAY SCENARIO 29A.
3. VERIFY THAT THE SYSTEM CALCULATES THE CORRECT PAYMENT FOR A REST DAY SCENARIO 29B.
4. VERIFY THAT THE SYSTEM CALCULATES THE CORRECT PAYMENT FOR MULTIPLE REST DAY SCENARIOS RECORDED FOR A SINGLE DISPATCHER.
5. VERIFY THAT THE SYSTEM CALCULATES THE CORRECT PAYMENT FOR REST DAY SCENARIOS ACROSS MULTIPLE DISPATCHERS.

SUCCESS CRITERION 3: USER INTERFACE ALIGNMENT
1. VERIFY THAT THE USER INTERFACE FOR RECORDING REST DAY SCENARIOS MATCHES THE UI REQUIREMENTS DOCUMENT.
2. VERIFY THAT ALL FORM FIELDS REQUIRED FOR RECORDING REST DAY SCENARIOS ARE PRESENT AND CLEARLY LABELED.
3. VERIFY THAT THE USER INTERFACE FLOW FOR RECORDING REST DAY SCENARIOS IS LOGICAL AND MATCHES THE PREDEFINED USER JOURNEY.

SUCCESS CRITERION 4: UPDATE ATTENDANCE RECORDS
1. VERIFY THAT THE DISPATCHER'S ATTENDANCE RECORDS ARE UPDATED ACCURATELY AFTER RECORDING A REST DAY SCENARIO.
2. VERIFY THAT THE ATTENDANCE RECORDS REFLECT THE CORRECT REST DAY SCENARIO TYPE AS PER THE PREDEFINED RULES.

SUCCESS CRITERION 5: PAYROLL SYSTEM INTEGRATION
1. VERIFY THAT THE REST DAY PAYMENT AMOUNT IS CORRECTLY PASSED TO THE PAYROLL SYSTEM WITHOUT MANUAL INTERVENTION.
2. VERIFY THAT THE PAYROLL SYSTEM PROCESSES THE PAYMENT AMOUNT RECEIVED FROM THE REST DAY TIME RECORDING SYSTEM CORRECTLY.

SUCCESS CRITERION 6: LOGGING ACTIONS
1. VERIFY THAT ALL ACTIONS TAKEN BY TIME ADMINISTRATORS ARE LOGGED FOR AUDIT PURPOSES.
2. VERIFY THAT THE LOGS INCLUDE DETAILED INFORMATION SUCH AS THE TYPE OF ACTION, TIMESTAMP, AND THE ADMINISTRATOR'S IDENTITY.

SUCCESS CRITERION 7: ERROR HANDLING
1. VERIFY THAT THE SYSTEM PROVIDES MEANINGFUL ERROR MESSAGES FOR INVALID REST DAY SCENARIO ENTRIES.
2. VERIFY THAT THE SYSTEM HANDLES UNEXPECTED ERRORS GRACEFULLY WITHOUT CRASHING.

FIG. 5

Figure 5:
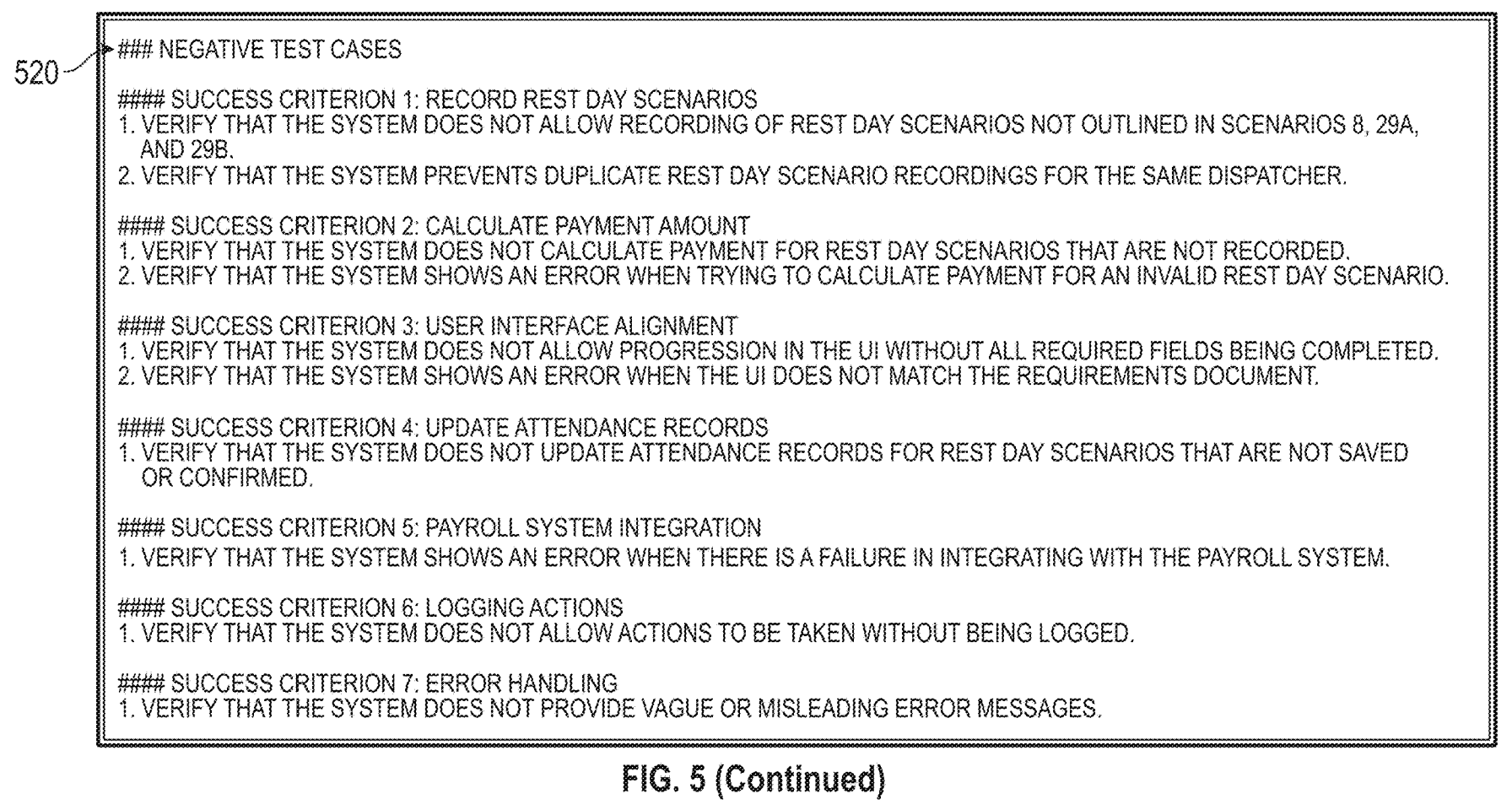

NEGATIVE TEST CASES

SUCCESS CRITERION 1: RECORD REST DAY SCENARIOS
1. VERIFY THAT THE SYSTEM DOES NOT ALLOW RECORDING OF REST DAY SCENARIOS NOT OUTLINED IN SCENARIOS 8, 29A, AND 29B.
2. VERIFY THAT THE SYSTEM PREVENTS DUPLICATE REST DAY SCENARIO RECORDINGS FOR THE SAME DISPATCHER.

SUCCESS CRITERION 2: CALCULATE PAYMENT AMOUNT
1. VERIFY THAT THE SYSTEM DOES NOT CALCULATE PAYMENT FOR REST DAY SCENARIOS THAT ARE NOT RECORDED.
2. VERIFY THAT THE SYSTEM SHOWS AN ERROR WHEN TRYING TO CALCULATE PAYMENT FOR AN INVALID REST DAY SCENARIO.

SUCCESS CRITERION 3: USER INTERFACE ALIGNMENT
1. VERIFY THAT THE SYSTEM DOES NOT ALLOW PROGRESSION IN THE UI WITHOUT ALL REQUIRED FIELDS BEING COMPLETED.
2. VERIFY THAT THE SYSTEM SHOWS AN ERROR WHEN THE UI DOES NOT MATCH THE REQUIREMENTS DOCUMENT.

SUCCESS CRITERION 4: UPDATE ATTENDANCE RECORDS
1. VERIFY THAT THE SYSTEM DOES NOT UPDATE ATTENDANCE RECORDS FOR REST DAY SCENARIOS THAT ARE NOT SAVED OR CONFIRMED.

SUCCESS CRITERION 5: PAYROLL SYSTEM INTEGRATION
1. VERIFY THAT THE SYSTEM SHOWS AN ERROR WHEN THERE IS A FAILURE IN INTEGRATING WITH THE PAYROLL SYSTEM.

SUCCESS CRITERION 6: LOGGING ACTIONS
1. VERIFY THAT THE SYSTEM DOES NOT ALLOW ACTIONS TO BE TAKEN WITHOUT BEING LOGGED.

SUCCESS CRITERION 7: ERROR HANDLING
1. VERIFY THAT THE SYSTEM DOES NOT PROVIDE VAGUE OR MISLEADING ERROR MESSAGES.

Figure 6:
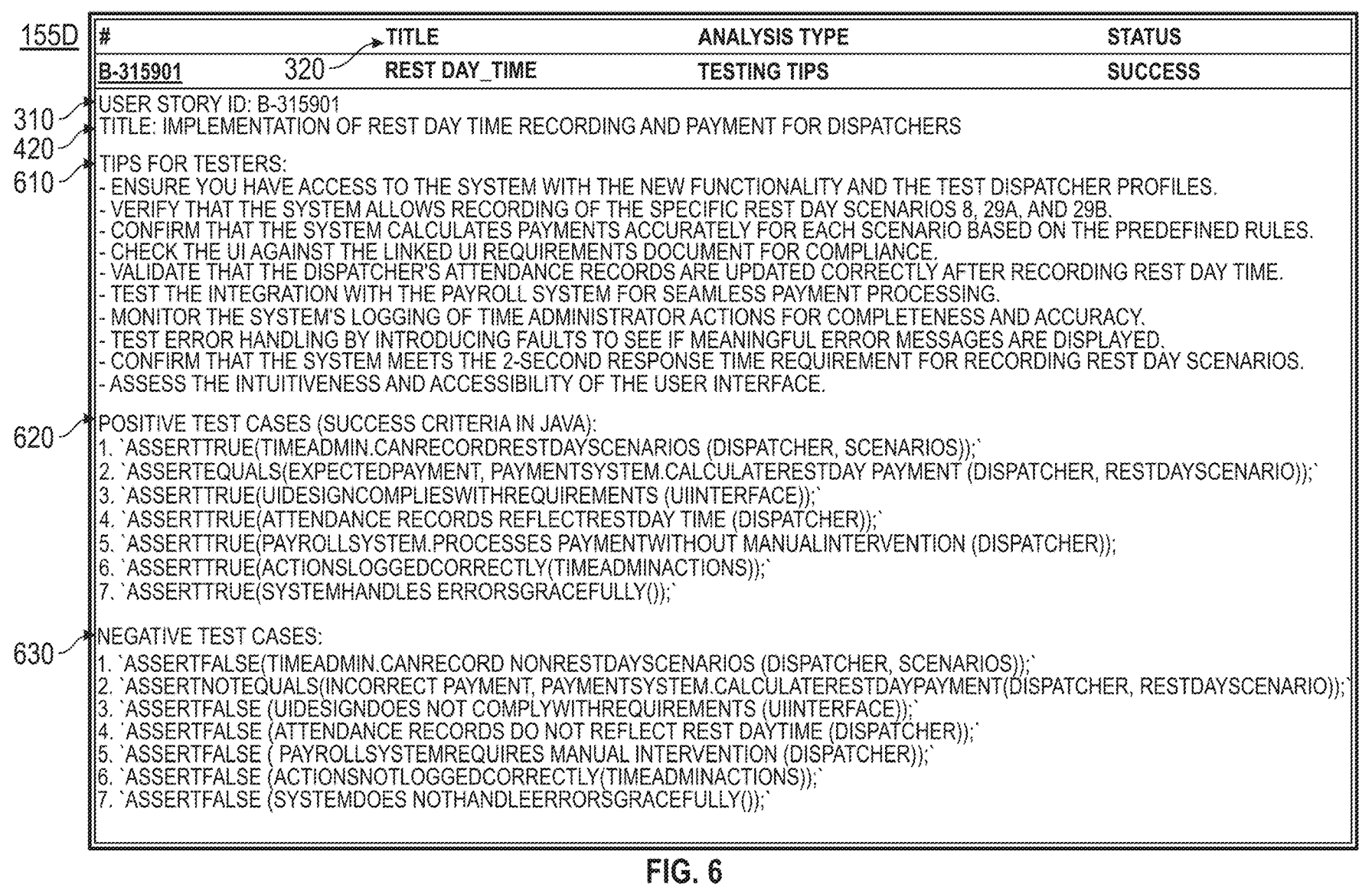

| # | TITLE | ANALYSIS TYPE | STATUS |
|---|---|---|---|
| B-315901 | REST_DAY_TIME RECORDING AND PAYMENT FOR DISPATCHERS | TESTING TIPS | SUCCESS |

USER STORY ID: B-315901
TITLE: IMPLEMENTATION OF REST DAY TIME RECORDING AND PAYMENT FOR DISPATCHERS

TIPS FOR TESTERS:
- ENSURE YOU HAVE ACCESS TO THE SYSTEM WITH THE NEW FUNCTIONALITY AND THE TEST DISPATCHER PROFILES.
- VERIFY THAT THE SYSTEM ALLOWS RECORDING OF THE SPECIFIC REST DAY SCENARIOS 8, 29A, AND 29B.
- CONFIRM THAT THE SYSTEM CALCULATES PAYMENTS ACCURATELY FOR EACH SCENARIO BASED ON THE PREDEFINED RULES.
- CHECK THE UI AGAINST THE LINKED UI REQUIREMENTS DOCUMENT FOR COMPLIANCE.
- VALIDATE THAT THE DISPATCHER'S ATTENDANCE RECORDS ARE UPDATED CORRECTLY AFTER RECORDING REST DAY TIME.
- TEST THE INTEGRATION WITH THE PAYROLL SYSTEM FOR SEAMLESS PAYMENT PROCESSING.
- MONITOR THE SYSTEM'S LOGGING OF TIME ADMINISTRATOR ACTIONS FOR COMPLETENESS AND ACCURACY.
- TEST ERROR HANDLING BY INTRODUCING FAULTS TO SEE IF MEANINGFUL ERROR MESSAGES ARE DISPLAYED.
- CONFIRM THAT THE SYSTEM MEETS THE 2-SECOND RESPONSE TIME REQUIREMENT FOR RECORDING REST DAY SCENARIOS.
- ASSESS THE INTUITIVENESS AND ACCESSIBILITY OF THE USER INTERFACE.

POSITIVE TEST CASES (SUCCESS CRITERIA IN JAVA):
1. `ASSERTTRUE(TIMEADMIN.CANRECORDRESTDAYSCENARIOS (DISPATCHER, SCENARIOS));`
2. `ASSERTEQUALS(EXPECTEDPAYMENT, PAYMENTSYSTEM.CALCULATERESTDAY PAYMENT (DISPATCHER, RESTDAYSCENARIO));`
3. `ASSERTTRUE(UIDESIGNCOMPLIESWITHREQUIREMENTS (UIINTERFACE));`
4. `ASSERTTRUE(ATTENDANCE RECORDS REFLECTRESTDAY TIME (DISPATCHER));`
5. `ASSERTTRUE(PAYROLLSYSTEM PROCESSES PAYMENTWITHOUT MANUALINTERVENTION (DISPATCHER));`
6. `ASSERTTRUE(ACTIONSLOGGEDCORRECTLY(TIMEADMINACTIONS));`
7. `ASSERTTRUE(SYSTEMHANDLES ERRORSGRACEFULLY());`

NEGATIVE TEST CASES:
1. `ASSERTFALSE(TIMEADMIN.CANRECORD NONRESTDAYSCENARIOS (DISPATCHER, SCENARIOS));`
2. `ASSERTNOTEQUALS(INCORRECT PAYMENT, PAYMENTSYSTEM.CALCULATERESTDAYPAYMENT(DISPATCHER, RESTDAYSCENARIO));`
3. `ASSERTFALSE (UIDESIGNDOES NOT COMPLYWITHREQUIREMENTS (UIINTERFACE));`
4. `ASSERTFALSE (ATTENDANCE RECORDS DO NOT REFLECT REST DAYTIME (DISPATCHER));`
5. `ASSERTFALSE ( PAYROLLSYSTEMREQUIRES MANUAL INTERVENTION (DISPATCHER));`
6. `ASSERTFALSE (ACTIONSNOTLOGGEDCORRECTLY(TIMEADMINACTIONS));`
7. `ASSERTFALSE (SYSTEMDOES NOTHANDLEERRORSGRACEFULLY());`

| # | TITLE | ANALYSIS TYPE | STATUS |
| --- | --- | --- | --- |
| | | ACCEPTANCE CRITERIA | |
| B-315901 | REST DAY_TIME | | SUCCESS |

310

320

710

BASED ON THE PROVIDED FEATURE DESCRIPTION, HERE ARE THE DETAILED ACCEPTANCE CRITERIA IN THE "AS A (INTENDED USER), I WANT TO (INTENDED ACTION), SO THAT (GOAL/OUTCOME OF ACTION)" FORMAT:

1. AS A TIME ADMINISTRATOR, I WANT TO RECORD OVERTIME SCENARIOS FOR DISPATCHERS ON THEIR REST DAYS, SO THAT THEY ARE COMPENSATED CORRECTLY ACCORDING TO OPERATIONAL GUIDELINES AND LABOR AGREEMENTS.

2. AS A TIME ADMINISTRATOR, I WANT TO RECORD CALL-BACK SCENARIOS FOR DISPATCHERS ON THEIR REST DAYS, SO THAT THE APPROPRIATE PAYMENT IS PROCESSED IN LINE WITH THE PREDEFINED RULES.

3. AS A TIME ADMINISTRATOR, I WANT TO RECORD DIFFERENT TYPES OF LEAVE FOR DISPATCHERS ON THEIR REST DAYS, SO THAT THEIR ATTENDANCE RECORDS ARE UPDATED ACCURATELY AND PAYMENTS ARE ADJUSTED ACCORDINGLY.

4. AS A TIME ADMINISTRATOR, I WANT THE SYSTEM TO CALCULATE PAYMENT AMOUNTS FOR REST DAY SCENARIOS AUTOMATICALLY, SO THAT DISPATCHERS RECEIVE THE CORRECT COMPENSATION WITHOUT MANUAL CALCULATION ERRORS.

5. AS A TIME ADMINISTRATOR, I WANT A USER INTERFACE THAT IS CONSISTENT WITH THE LINKED UI REQUIREMENTS DOCUMENT, SO THAT I CAN EFFICIENTLY RECORD REST DAY SCENARIOS.

6. AS A TIME ADMINISTRATOR, I WANT THE SYSTEM TO UPDATE DISPATCHER ATTENDANCE RECORDS WHEN I RECORD REST DAY TIME, SO THAT THEIR RECORDS REFLECT THE ACTUAL TIME WORKED OR ON LEAVE.

7. AS A TIME ADMINISTRATOR, I WANT THE SYSTEM TO INTEGRATE WITH THE PAYROLL SYSTEM SEAMLESSLY, SO THAT DISPATCHER PAYMENTS FOR REST DAY SCENARIOS ARE PROCESSED CORRECTLY WITHOUT MY MANUAL INTERVENTION.

8. AS A TIME ADMINISTRATOR, I WANT THE SYSTEM TO LOG ALL MY ACTIONS RELATED TO REST DAY TIME RECORDING, SO THAT THERE IS AN AUDIT TRAIL FOR TRACKING AND VERIFICATION PURPOSES.

9. AS A TIME ADMINISTRATOR, I WANT THE SYSTEM TO PROVIDE MEANINGFUL ERROR MESSAGES WHEN ISSUES OCCUR, SO THAT I CAN UNDERSTAND AND RESOLVE PROBLEMS QUICKLY.

10. AS A TIME ADMINISTRATOR, I WANT THE SYSTEM'S RESPONSE TIME FOR RECORDING A REST DAY SCENARIO TO NOT EXCEED 2 SECONDS, SO THAT I CAN WORK EFFICIENTLY WITHOUT UNNECESSARY DELAYS.

11. AS A TIME ADMINISTRATOR, I WANT THE USER INTERFACE TO BE INTUITIVE AND ACCESSIBLE, FOLLOWING UI/UX BEST PRACTICES, SO THAT I CAN NAVIGATE AND USE THE SYSTEM WITH EASE.

THESE ACCEPTANCE CRITERIA ARE DESIGNED TO ENSURE THAT THE FEATURE MEETS THE FUNCTIONAL AND NON-FUNCTIONAL REQUIREMENTS OUTLINED IN THE FEATURE DESCRIPTION. THEY ARE ALSO STRUCTURED TO FACILITATE THE CREATION OF TEST CASES THAT WILL VALIDATE EACH ASPECT OF THE FUNCTIONALITY.

FIG. 7

900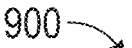

```
                        ┌─────────────┐
                        │    Start    │
                        └─────────────┘
                               │
                               ▼
910
┌──────────────────────────────────────────────────────────┐
│  Access an APM user story of a plurality of APM user stories │
└──────────────────────────────────────────────────────────┘
                               │
                               ▼
920
┌──────────────────────────────────────────────────────────┐
│  Access a plurality of an artificial intelligence (AI) chatbot │
│                        prompts                             │
└──────────────────────────────────────────────────────────┘
                               │
                               ▼
930
┌──────────────────────────────────────────────────────────┐
│  Access a plurality of large language model (LLM) parameters │
└──────────────────────────────────────────────────────────┘
                               │
                               ▼
940
┌──────────────────────────────────────────────────────────┐
│  Electronically transmit the APM user story, the plurality  │
│  of AI chatbot prompts, and the LLM parameters to an AI     │
│                        chatbot                             │
└──────────────────────────────────────────────────────────┘
                               │
                               ▼
950
┌──────────────────────────────────────────────────────────┐
│  Electronically receive, across the communications         │
│  network, an APM AI response generated by the AI           │
│  chatbot using the APM user story, the plurality of AI      │
│  chatbot prompts, and the LLM parameters                   │
└──────────────────────────────────────────────────────────┘
                               │
                               ▼
960
┌──────────────────────────────────────────────────────────┐
│  Display the APM AI response generated by the AI           │
│           chatbot on an electronic display                 │
└──────────────────────────────────────────────────────────┘
                               │
                               ▼
                        ┌─────────────┐
                        │     End     │
                        └─────────────┘
```

FIG. 9

SYSTEMS AND METHODS FOR USING GENERATIVE ARTIFICIAL INTELLIGENCE WITH AGILE PROJECT MANAGEMENT

TECHNICAL FIELD

This disclosure generally relates to agile project management (APM), and more specifically to systems and methods for using generative artificial intelligence (AI) with APM.

BACKGROUND

Agile project management (APM) is an iterative approach to managing software development projects. APM involves continuous releases while soliciting and incorporating feedback from customers with every iteration. A typical APM process begins with a user creating a user story that includes a description of a unit of work (e.g., software to accomplish a specific task). The user story is then collectively reviewed and refined by a team that includes the product owner, a developer, and a quality tester. However, user stories that are manually created by users are often incomplete, lack a uniform format, and are inefficient at conveying the desired unit of work to be performed.

SUMMARY

The present disclosure achieves technical advantages as systems, methods, and computer-readable storage media for using artificial intelligence (AI) with agile project management (APM). The present disclosure provides for a system integrated into a practical application with meaningful limitations that may include electronically transmitting, to an AI chatbot across a communications network, an APM user story, a plurality of AI chatbot prompts, and a plurality of LLM parameters. Other meaningful limitations of the system integrated into a practical application include: electronically receiving, across the communications network, an APM AI response generated by the AI chatbot using the APM user story, the plurality of AI chatbot prompts, and the LLM parameters; and displaying the APM AI response generated by the AI chatbot on an electronic display.

The present disclosure solves the technological problem of a lack of technical functionality for automatically generating APM user stories. The technological solutions provided herein, and missing from conventional systems, are more than a mere application of a manual process to a computerized environment, but rather include functionality (including artificial intelligence functionality) to implement a technical process to supplement current manual solutions for generating APM user stories. In doing so, the present disclosure goes well beyond a mere application the manual process to a computer.

Unlike existing solutions where personnel may be required to manually generate APM user stories, embodiments of this disclosure provide systems and methods that provide functionality for utilizing AI to analyze and rewrite APM user stories. By providing AI-generated user stories in an APM environment, the efficiency of the APM environment may be increased and bandwidth of personnel typically tasked with reviewing and revising APM user stories may be increased. For example, the time required to analyze and revise APM user stories may be greatly reduced. Furthermore, AI-generated APM user stories of the disclosed embodiments may enable better iterations of software code, thereby reducing computing resources (e.g., processing, memory, and electrical power) that would otherwise be used with poorly-written APM user stories. Other technical advantages will be readily apparent to one skilled in the art from the following figures, descriptions, and claims. Moreover, while specific advantages have been enumerated above, various embodiments may include all, some, or none of the enumerated advantages.

In some embodiments, the disclosed models are formulated or otherwise configured to utilize various constraints and objectives in order to perform or execute a designated task (e.g., one or more features of APM AI tool 160, in accordance with one or more embodiments of the present disclosure). In other embodiments, the present disclosure includes techniques for implementing and training models (e.g., machine-learning models, artificial intelligence models, algorithmic constructs, optimizers, etc.) for performing or executing a designated task or a series of tasks (e.g., one or more features of APM AI tool 160, in accordance with one or more embodiments of the present disclosure). In these embodiments, the disclosed techniques provide a systematic approach for the training of such models to enhance performance, accuracy, and efficiency in their respective applications. In embodiments, the techniques for training the models can include collecting a set of data from a database, conditioning the set of data to generate a set of conditioned data, and/or generating a set of training data including the collected set of data and/or the conditioned set of data.

In some embodiments, a model can undergo a training phase wherein the model may be exposed to the set of training data, such as through an iterative processes of learning in which the model adjusts and optimizes its parameters and algorithms to improve its performance on the designated task or series of tasks. This training phase may configure the model to develop the capability to perform its intended function with a high degree of accuracy and efficiency. In embodiments, the conditioning of the set of data may include modification, transformation, and/or the application of targeted algorithms to prepare the data for training. The conditioning step may be configured to ensure that the set of data is in an optimal state for training the model, resulting in an enhancement of the effectiveness of the model's learning process. These features and techniques not only qualify as patent-eligible features but also introduce substantial improvements to the field of computational modeling. These features are not merely theoretical but represent an integration of a concepts into practical applications that significantly enhance the functionality, reliability, and efficiency of the models developed through these processes.

In embodiments, the present disclosure includes techniques for generating a notification of an event (e.g., an output notification, a user notification, etc.) that includes generating an alert that includes information specifying the location of a source of data associated with the event, formatting the alert into data structured according to an information format, and transmitting the formatted alert over a network to a device associated with a receiver based upon a destination address and a transmission schedule. In embodiments, receiving the alert enables a connection from the device associated with the receiver to the data source over the network when the device is connected to the source to retrieve the data associated with the event and causes a viewer application (e.g., a graphical user interface (GUI)) to be activated to display the data associated with the event. These features represent patent eligible features, as these features amount to significantly more than an abstract idea.

Such features, when considered as an ordered combination, amount to significantly more than simply organizing and comparing data. The features address the Internet-centric challenge of alerting a receiver with time sensitive information. This is addressed by transmitting the alert over a network to activate the viewer application, which enables the connection of the device of the receiver to the source over the network to retrieve the data associated with the event. These are meaningful limitations that add more than generally linking the use of an abstract idea (e.g., the general concept of organizing and comparing data) to the Internet, because they solve an Internet-centric problem with a solution that is necessarily rooted in computer technology. These features, when taken as an ordered combination, provide unconventional steps that confine the abstract idea to a particular useful application. Therefore, these features represent patent eligible subject matter.

Moreover, in embodiments, one or more operations and/ or functionality of components described herein can be distributed across a plurality of computing systems (e.g., personal computers (PCs), user devices, servers, processors, etc.), such as by implementing the operations over a plurality of computing systems. This distribution can be configured to facilitate the optimal load balancing of requests, which can encompass a wide spectrum of network traffic or data transactions. By leveraging a distributed operational framework, a system implemented in accordance with embodiments of the present disclosure can effectively manage and mitigate potential bottlenecks, ensuring equitable processing distribution and preventing any single device from shouldering an excessive burden. This load balancing approach significantly enhances the overall responsiveness and efficiency of the network, markedly reducing the risk of system overload and ensuring continuous operational uptime. The technical advantages of this distributed load balancing can extend beyond mere efficiency improvements. It introduces a higher degree of fault tolerance within the network, where the failure of a single component does not precipitate a systemic collapse, markedly enhancing system reliability.

Additionally, this distributed configuration promotes a dynamic scalability feature, enabling the system to adapt to varying levels of demand without necessitating substantial infrastructural modifications. The integration of advanced algorithmic strategies for traffic distribution and resource allocation can further refine the load balancing process, ensuring that computational resources are utilized with optimal efficiency and that data flow is maintained at an optimal pace, regardless of the volume or complexity of the requests being processed. Moreover, the practical application of these disclosed features represents a significant technical improvement over traditional centralized systems. Through the integration of the disclosed technology into existing networks, entities can achieve a superior level of service quality, with minimized latency, increased throughput, and enhanced data integrity. The distributed approach of embodiments not only bolster the operational capacity of computing networks but offer a robust framework for the development of future technologies, underscoring its value as a foundational advancement in the field of network computing.

Further, to aid in the load balancing, the computing system can spawn multiple processes and threads to process data concurrently. The speed and efficiency of the computing system can be greatly improved by instantiating more than one process or thread to implement the claimed functionality. However, one skilled in the art of programming will appreciate that use of a single process or thread can also be utilized and is within the scope of the present disclosure.

Accordingly, the present disclosure discloses concepts inextricably tied to computer technology such that the present disclosure provides the technological benefit of implementing functionality to utilize AI in an APM environment. The systems and techniques of embodiments provide improved systems by providing capabilities to perform functions that are currently performed manually and to perform functions that are currently not possible.

In one particular embodiment, a system includes one or more memory units configured to store a plurality of APM user stories, a plurality of AI chatbot prompts, and a plurality of large language model (LLM) parameters. Each APM user story of the plurality of APM user stories includes a user description of a unit of work to be performed. The system further includes one or more computer processors communicatively coupled to the one or more memory units. The one or more computer processors are configured to access an APM user story of the plurality of APM user stories. The one or more computer processors are further configured to access the plurality of AI chatbot prompts and the plurality of LLM parameters. The one or more computer processors are further configured to electronically transmit, to an AI chatbot across a communications network, the APM user story, the plurality of AI chatbot prompts, and the LLM parameters. The one or more computer processors are further configured to electronically receive, across the communications network, an APM AI response generated by the AI chatbot using the APM user story, the plurality of AI chatbot prompts, and the LLM parameters. The one or more computer processors are further configured to display the APM AI response generated by the AI chatbot on an electronic display.

In another embodiment, a method for using AI with APM includes accessing an APM user story of a plurality of APM user stories stored in one or more memory units. Each APM user story of the plurality of APM user stories includes a user description of a unit of work to be performed. The method further includes accessing a plurality of AI chatbot prompts stored in the one or more memory units. The method further includes accessing a plurality of LLM parameters stored in the one or more memory units. The method further includes electronically transmitting, to an AI chatbot across a communications network, the APM user story, the plurality of AI chatbot prompts, and the LLM parameters. The method further includes electronically receiving, across the communications network, an APM AI response generated by the AI chatbot using the APM user story, the plurality of AI chatbot prompts, and the LLM parameters. The method further includes displaying the APM AI response generated by the AI chatbot on an electronic display.

In another embodiment, one or more computer-readable non-transitory storage media embodies instructions that, when executed by a processor, cause the processor to perform operations that include accessing an APM user story of a plurality of APM user stories stored in one or more memory units. Each APM user story of the plurality of APM user stories includes a user description of a unit of work to be performed. The operations further include accessing a plurality of AI chatbot prompts stored in the one or more memory units. The operations further include accessing a plurality of LLM parameters stored in the one or more memory units. The operations further include electronically transmitting, to an AI chatbot across a communications network, the APM user story, the plurality of AI chatbot prompts, and the LLM parameters. The operations further include electronically receiving, across the communications network, an APM AI response generated by the AI chatbot using the APM user story, the plurality of AI chatbot prompts, and the LLM parameters. The operations further include displaying the APM AI response generated by the AI chatbot on an electronic display.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present disclosure, reference is now made to the following descriptions taken in conjunction with the accompanying drawings, in which:

FIG. 2 illustrates an example APM user story that may be analyzed and revised by the APM AI system of FIG. 1, according to particular embodiments.

FIG. 3 illustrates an APM AI review response that may be generated by the APM AI system of FIG. 1, according to particular embodiments.

FIG. 4 illustrates an APM AI rewrite response that may be generated by the APM AI system of FIG. 1, according to particular embodiments.

FIG. 5 illustrates an APM AI response for test cases that may be generated by the APM AI system of FIG. 1, according to particular embodiments.

FIG. 6 illustrates an APM AI response for testing tips that may be generated by the APM AI system of FIG. 1, according to particular embodiments.

FIG. 7 illustrates an APM AI response for acceptance criteria that may be generated by the APM AI system of FIG. 1, according to particular embodiments.

FIG. 9 is a chart illustrating a method for using AI with APM, according to particular embodiments.

Figure 1:
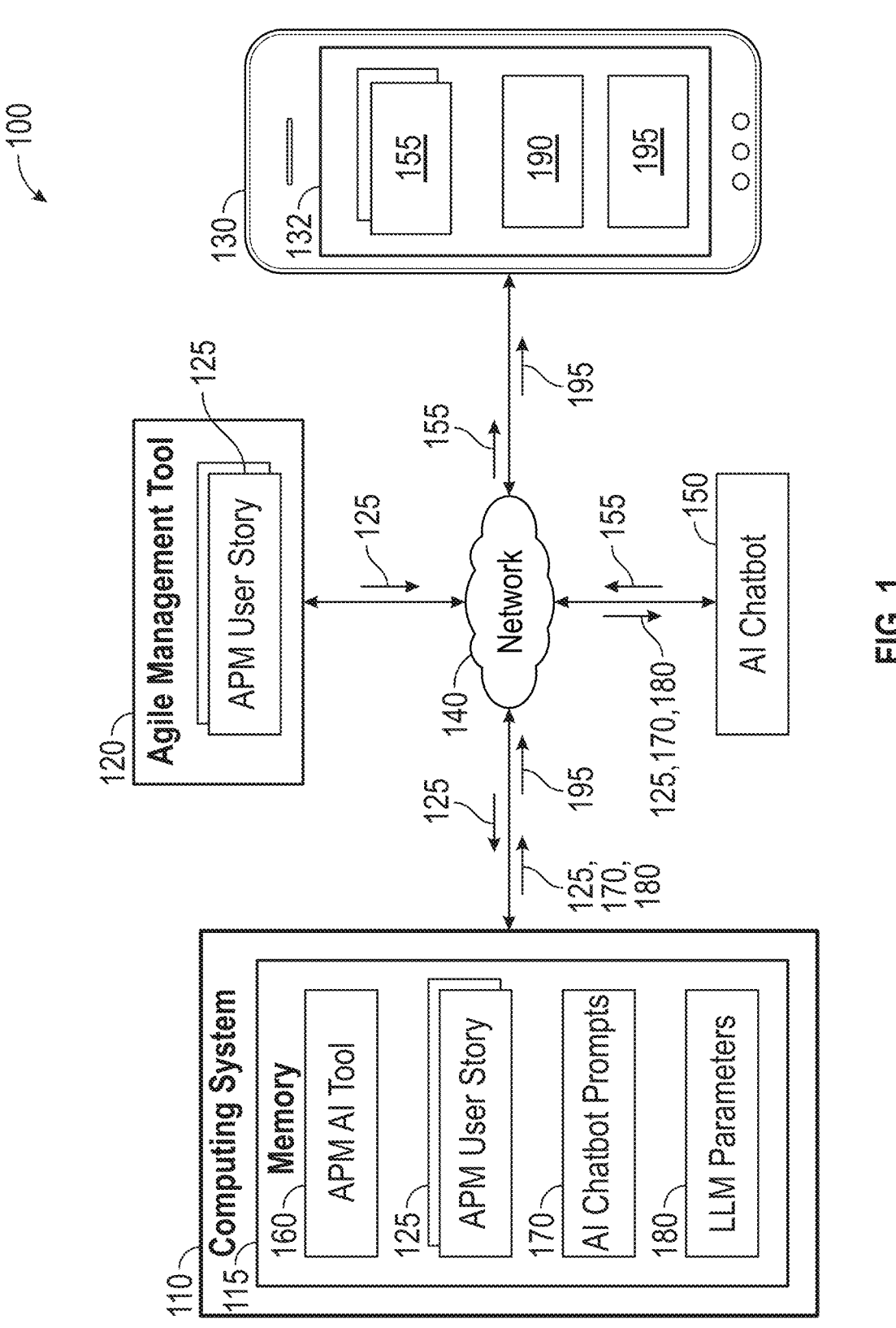
FIG. 1 is a diagram illustrating an agile project management (APM) artificial intelligence (AI) system, according to particular embodiments.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. The Examiner, after having obtained a thorough understanding of the disclosure and claims of the present application has searched the prior art as disclosed in patents and other published documents, i.e., nonpatent literature. Therefore, as evidenced by issuance of this patent, the prior art fails to disclose or teach the elements and limitations presented in the claims as enabled by the specification and drawings, such that the presented claims are patentable under the applicable laws and rules of this jurisdiction.

Agile project management (APM) is an iterative approach to managing software development projects. APM involves continuous releases while soliciting and incorporating feedback from customers with every iteration. A typical APM process begins with a user manually creating a user story that includes a description of a unit of work to be performed (e.g., software to accomplish a specific task). The user story is then collectively reviewed and refined by a team that includes the product owner, a developer, and a quality tester (collectively referred to in the industry as the "three amigos"). However, user stories that are manually created by users are often incomplete, lack a uniform format, and are inefficient at conveying the desired unit of work to be performed. These and other issues with APM user stories that are manually created by a user hinder the process of reviewing and refining the APM user stories by the three amigos. This may result in testing gaps, missed timelines, and elevated risks of failure in production.

To address these and other problems with manually-created APM user stories, the disclosed embodiments provide systems and methods for using generative artificial intelligence (AI) to review and refine APM user stories prior to the reviewing and refining process of APM user stories by the three amigos. For example, embodiments of the disclosure utilize an AI chatbot such as ChatGPT to review and rewrite manually-created APM user stories prior to their review by the three amigos. To do so, some embodiments may access predetermined AI chatbot prompts and LLM parameters that are stored in memory. The AI chatbot prompts and LLM parameters are specifically crafted to instruct the AI chatbot to perform specific actions on the manually-created APM user stories (e.g., review and revise the APM user stories). A manually-created APM user story is sent to the AI chatbot (e.g., using an API) along with the AI chatbot prompts and LLM parameters. The AI chatbot generates an APM AI response using the manually-created APM user story, the AI chatbot prompts, and the LLM parameters. The APM AI response from the AI chatbot may be, for example, a review of the manually-created APM user story or a revised APM user story. The disclosed embodiments may receive the APM AI response generated by the AI chatbot (e.g., using an API) and may display the generated APM AI response on an electronic display. The APM AI response generated by the AI chatbot may then be reviewed by the three amigos. Because the APM AI response generated by the AI chatbot may be in a standardized format and may include more detailed and complete information from the manually-created APM user story, the review/revise process by the three amigos may be more efficient and may result in better testing coverage. This may result in an overall increase in efficiency and a decrease in the risk of failure in the APM environment.

FIG. 1 is a diagram illustrating an APM AI system 100, according to particular embodiments. APM AI system 100 includes a computing system 110, an agile management tool 120, a client system 130, a network 140, and an AI chatbot 150. Computing system 110, agile management tool 120, client system 130, and AI chatbot 150 are all communicatively coupled with each other using any appropriate wired or wireless communication system or network (e.g., network 140). Computing system 110 includes a computer processor (e.g., processor 1002) and memory 115 that stores an APM AI tool 160, AI chatbot prompts 170, and LLM parameters 180. Client system 130 includes an electronic display for displaying a user interface 132.

In general, APM AI system 100 analyzes and processes APM user stories 125 for use in an APM environment. To do so, APM AI tool 160 first accesses APM user stories 125 (e.g., from memory 115 or from agile management tool 120). APM AI tool 160 also accesses AI chatbot prompts 170 and LLM parameters 180 stored in memory 115. APM AI tool 160 then sends the APM user story 125, AI chatbot prompts 170, and LLM parameters 180 to AI chatbot 150 (e.g., using an API and network 140). AI chatbot 150 analyzes APM user story 125 using AI chatbot prompts 170 and LLM parameters 180 and generates an APM AI response 155. APM AI response 155 may be, for example, a review analysis of APM user story 125 or a rewritten APM user story 125. APM AI tool 160 receives APM AI response 155 from AI chatbot 150 (e.g., via an API and network 140) and displays APM AI response 155 on an electronic display (e.g., on client system 130). Users (e.g., the three amigos) may then review/revise APM AI response 155. As a result, the review/revise process of APM user stories by the three amigos may be more efficient and may result in better testing coverage.

Computing system 110 may be any appropriate computing system in any suitable physical form. As example and not by way of limitation, computing system 110 may be an embedded computer system, a system-on-chip (SOC), a single-board computer system (SBC) (such as, for example, a computer-on-module (COM) or system-on-module (SOM)), a desktop computer system, a laptop or notebook computer system, a mainframe, a mesh of computer systems, a mobile telephone, a personal digital assistant (PDA), a server, a tablet computer system, an augmented/virtual reality device, or a combination of two or more of these. Where appropriate, computing system 110 may include one or more computer systems; be unitary or distributed; span multiple locations; span multiple machines; span multiple data centers; or reside in a cloud, which may include one or more cloud components in one or more networks. Where appropriate, computing system 110 may perform without substantial spatial or temporal limitation one or more steps of one or more methods described or illustrated herein. As an example, and not by way of limitation, computing system 110 may perform in real time or in batch mode one or more steps of one or more methods described or illustrated herein. Computing system 110 may perform at different times or at different locations one or more steps of one or more methods described or illustrated herein, where appropriate. A particular example of a computing system 110 is described in reference to FIG. 10.

Computing system 110 includes one or more memory units/devices 115 (collectively herein, "memory 115") that may store APM AI tool 160, AI chatbot prompts 170, and LLM parameters 180. APM AI tool 160 may be a software module/application utilized by computing system 110 to analyze and revise APM user stories 125, as described herein. APM AI tool 160 represents any suitable set of instructions, logic, or code embodied in a computer-readable storage medium. For example, APM AI tool 160 may be embodied in memory 115, a disk, a CD, or a flash drive. In particular embodiments, APM AI tool 160 may include instructions (e.g., a software application) executable by a computer processor to perform some or all of the functions described herein.

Agile management tool 120 is any appropriate tool, system, software application, etc. for providing an agile product management environment. In some embodiments, agile management tool 120 may be executed on a separate computing system from computing system 110. In other embodiments, agile management tool 120 may be executed by computing system 110. Examples of agile management tool 120 include JIRA and AGILITY.

In some embodiments, agile management tool 120 stores APM user stories 125 that are generated by users. In general, an APM user story 125 includes a user description of a unit of work to be performed (e.g., software to be created for a particular task). APM user story 125 is typically manually created by a user, and the user may create a new APM user story 125 for each new unit of work to be performed. An example of APM user story 125 is illustrated in FIG. 2. As illustrated in FIG. 2, some embodiments of APM user story 125 includes a "description" section and a "benefits" section. Other embodiments may include additional or alternate sections. In some embodiments, agile management tool 120 may provide a user interface that allows a user to create APM user story 125.

Client system 130 is any appropriate user device for communicating with components of APM AI system 100 over network 140 (e.g., the internet). In particular embodiments, client system 130 may be an electronic device including hardware, software, or embedded logic components or a combination of two or more such components and capable of carrying out the appropriate functionalities implemented or supported by client system 130. As an example, and not by way of limitation, a client system 130 may include a computer system (e.g., computer system 1000)

such as a desktop computer, notebook or laptop computer, netbook, a tablet computer, e-book reader, GPS device, camera, personal digital assistant (PDA), handheld electronic device, cellular telephone, smartphone, smartwatch, augmented/virtual reality device such as wearable computer glasses, other suitable electronic device, or any suitable combination thereof. This disclosure contemplates any suitable client system 130. A client system 130 may enable a network user at client system 130 to access network 140. A client system 130 may enable a user to communicate with other users at other client systems 130. Client system 130 may include an electronic display that displays graphical user interface 132, a processor such processor 1002, and memory such as memory 1004.

Network 140 allows communication between and amongst the various components of APM AI system 100. This disclosure contemplates network 140 being any suitable network operable to facilitate communication between the components of APM AI system 100. Network 140 may include any interconnecting system capable of transmitting audio, video, signals, data, messages, or any combination of the preceding. Network 140 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication network, a Zigbee network, and/or any other suitable network.

AI chatbot 150 is any appropriate system or software program that uses AI to simulate human conversation using speech or text. AI chatbot 150 may be trained on large amounts of data (e.g., public or private data) and may use AI algorithms to understand user questions and then respond appropriately. For example, AI chatbot 150 may utilize machine learning, natural language processing (NLP), or natural language understanding (NLU) in order to interpret user questions and respond accordingly. An example of AI chatbot 150 is ChatGPT. In some embodiments, AI chatbot 150 may utilize an API (e.g., REST API) to send and receive data.

In general, AI chatbot 150 receives APM user stories 125, AI chatbot prompts 170, and LLM parameters 180 as inputs and then generates APM AI response 155 based on the inputs. Various examples of APM AI responses 155 (e.g., 155A-155E) are illustrated in FIGS. 3-7 and are discussed in more detail below.

FIG. 3 illustrates an APM AI review response 155A that may be generated by AI chatbot 150 using APM user story 125, AI chatbot prompts 170, and LLM parameters 180, according to certain embodiments. In general, APM AI review response 155A is a detailed analysis/review of the manually-created APM user story 125 and may include suggestions for improving APM user story 125. In some embodiments, APM AI review response 155A includes a story ID 310 and a story title 320, both of which are extracted from APM user story 125. In some embodiments, APM AI review response 155A includes a rating score 330 and a detailed reasoning 340 for rating score 330. Rating score 330 may have any appropriate scale (e.g., 0-10) and may indicate a quality of the manually-written APM user story 125. In some embodiments, APM AI review response 155A includes one or more suggestions for improvement 350. For example, as illustrated in FIG. 3, suggestions for improvement 350 may include specific content to add to APM user story 125, specific sections to add to APM user story 125, examples to include in APM user story 125, and clarifications/edits to make to APM user story 125.

FIG. 4 illustrates an APM AI rewrite response 155B that may be generated by AI chatbot 150 using APM user story 125, AI chatbot prompts 170, and LLM parameters 180, according to certain embodiments. In general, APM AI rewrite response 155B is an AI-generated APM user story based on a manually-created APM user story 125. In some embodiments, APM AI rewrite response 155B includes a rewritten story title 420. Rewritten story title 420 is generated by AI chatbot 150 and is based on story title 320 and the overall contents of APM user story 125. In some embodiments, APM AI rewrite response 155B includes a description section 430, which is an overall description of the unit of work to be performed. In some embodiments, APM AI rewrite response 155B includes a dependency section 440, which lists one or more items on which the story depends. In some embodiments, APM AI rewrite response 155B includes a success criteria section 450, which includes one or more items that must occur or be performed in order for the story to be deemed a success. In some embodiments, APM AI rewrite response 155B includes a testing prerequisite section 460, which includes one or more items that must be available for the story to be adequately tested. In some embodiments, APM AI rewrite response 155B includes an extra information section 470, which includes one or more items from APM user story 125 that do not fit into any other category. In some embodiments, APM AI rewrite response 155B includes a non-functional requirements section 480 which lists one or more requirements that do not impact functionality. In some embodiments, APM AI rewrite response 155B includes an out of scope section 490 which lists one or more items that are not within the scope of APM user story 125.

FIG. 5 illustrates an APM AI response 155C for test cases that may be generated by AI chatbot 150 using an AI-rewritten APM user story 125 (i.e., APM AI rewrite response 155B), AI chatbot prompts 170, and LLM parameters 180, according to certain embodiments. In general, APM AI response 155C provides multiple test cases for APM user story 125. For example, some embodiments of APM AI response 155C may include positive test cases 510 and negative test cases 520 for various success criterion, as illustrated.

FIG. 6 illustrates an APM AI response 155D for testing tips that may be generated by AI chatbot 150 using an AI-rewritten APM user story 125 (i.e., APM AI rewrite response 155B), AI chatbot prompts 170, and LLM parameters 180, according to certain embodiments. In general, APM AI response 155D provides one or more tips or instructions 610 for testing APM user story 125. In some embodiments, APM AI response 155D includes positive test cases 620 and negative test cases 630 for various success criterion, as illustrated.

FIG. 7 illustrates an APM AI response 155E for acceptance criteria that may be generated by AI chatbot 150 using an AI-rewritten APM user story 125 (i.e., APM AI rewrite response 155B), AI chatbot prompts 170, and LLM parameters 180, according to certain embodiments. In general, APM AI response 155E provides acceptance criteria 710 for APM user story 125, as illustrated.

AI chatbot prompts 170 are one or more instructions for AI chatbot 150 to generate APM AI response 155 using APM user story 125. In general, AI chatbot prompts 170 include questions and statements that instruct AI chatbot 150 to perform a specific task on APM user story 125 (e.g., review or rewrite APM user story 125). In some embodiments, AI chatbot prompts 170 include one or more of the following: one or more instructions for AI chatbot 150 to assume a specific role; one or more instructions for AI chatbot 150 to give specific answers; one or more instructions for AI chatbot 150 to give the specific answers in a specific format; and one or more exclusion criteria for AI chatbot 150. For example, when APM AI response 155 is a review of APM user story 125 (i.e., APM AI review response 155A), AI chatbot prompts 170 include instructions for AI chatbot 150 to perform a review of APM user story 125. Example AI chatbot prompts 170 for AI chatbot 150 to perform a review of APM user story 125 are listed below:

You are an AI testing agile expert assistant with expertise in writing test cases Be very detailed as understanding is critical Based on the definition you will critically review based on agile best practices Suggest corrections for ambiguities and lack of clarity Suggest corrections for content, format, grammar, spelling, and overall flow Suggest changes for improvements Review the story for content and understanding giving a rating from '1—not understandable' to '10—well-defined'

Use weighting factors below when arriving at the rating

Success criteria with a level of details

Flow, clarity, grammar, spellings

NFRs present

Attachments and example for clarity

Do not discount for features having HTML tags

Your response must follow the structure as shown below

Story ID

Story Title

Rating

Detailed reasoning behind the rating

Suggestions for improvement

As another example, when APM AI response 155 is rewrite of APM user story 125 (i.e., APM AI review response 155B), AI chatbot prompts 170 include instructions for AI chatbot 150 to perform a rewrite of APM user story 125. Example AI chatbot prompts 170 for AI chatbot 150 to perform a rewrite of APM user story 125 are listed below:

You are an AI senior developer expert assistant with expertise in writing test cases You have deep railroad knowledge Be factual and provide clear, concise, and detailed answers Provide detailed clear, unambiguous and truthful answers The story is written by a product owner, and you have to rewrite the story in detail so a new developer will understand the story and develop the code AC1 means acceptance criteria 1, AC2 means acceptance criteria 2, and so on Rewrite the original story Incorporate suggestions for improvement Story must contain a detailed description of success criteria for every requirement include all information contained in the form of nested bullet lists must be represented in the form of acceptance criteria Must include all sections below and separate sections with new line Story Number Story Title Description (must contain detailed description on what is required and why it is required)

Dependencies on other Story or other objects

Success Criteria (important to be detailed using all information given)—give serial number Prerequisites for testing Extra Information Non-functional requirements (must contain detailed measure or give examples if none are present stating it is an example)

Note Out of Scope

As another example, when APM AI response 155 is APM AI response 155C for test cases, AI chatbot prompts 170 include instructions for AI chatbot 150 to generate test cases for APM user story 125. Example AI chatbot prompts 170 for AI chatbot 150 to generate test cases for APM user story 125 are listed below:

you are an AI testing agile expert assistant with expertise in writing test cases you have deep Railroad knowledge and experience in testing Railroad software Be very concise and factual Do not add any formalities and mannerisms while answering Provide clear, unambiguous and truthful answers.

As an expert automated testing writing expert your responsibility is to write detailed test cases for the below user story Your detailed response must contain below sections for each success criteria Positive Test Cases (this must have extensive multiple test cases for every success criterion and all possible combinations of data input and write test cases for each. Include the high priority industry standard test scenarios. Generate the test cases in well-defined step-by-step format)

Negative Test Cases (this must have extensive multiple test cases for every success criterion and all possible combinations of data input and write test cases for each. Include the high priority industry standard test scenarios. Generate the test cases in well-defined step-by-step format)

NFR test cases (must be specific with measurable target)

As another example, when APM AI response 155 is APM AI response 155D for testing tips, AI chatbot prompts 170 include instructions for AI chatbot 150 to generate testing tips for APM user story 125. Example AI chatbot prompts 170 for AI chatbot 150 to generate testing tips for APM user story 125 are listed below:

You are an AI testing agile expert assistant

You are an AI Railroad functional expert assistant

Be very concise and factual

Review the user story for content.

Your response must start with User Story ID & the User Story Title

Generate a set of tips for testers on how to write/execute test cases

Tips should be purely based on the user story content. You must not generate any generic tips Tips should cover aspects such as testing prerequisites (e.g., test data), test design, test execution Rewrite each success criteria in Java Identify section by Positive, Negative, NFR As another example, when APM AI response 155 is APM AI response 155E for acceptance criteria, AI chatbot prompts 170 include instructions for AI chatbot 150 to generate acceptance criteria for APM user story 125. Example AI chatbot prompts 170 for AI chatbot 150 to generate acceptance criteria for APM user story 125 are listed below:

> You are an experienced software testing lead experienced in testing applications
>
> You know that Features in agile project represent a piece of functionality relevant for an end user
>
> Feature description covers all aspects of the functionality including but not limited to:
>
> > Business Value
> >
> > Description of the functionality
> >
> > Acceptance criteria
>
> Non-functional requirements including but not limited to:
>
> > Application Performance metrics (e.g., response time, throughput etc.)
> >
> > Security requirements
> >
> > Usability
> >
> > User Experience
>
> Critically review the feature definition and then give detailed answers to the subsequent questions
>
> The feature description may contain the details in the form of nested bullet lists
>
> Consider the nesting levels to grasp the description of the feature
>
> Review the below feature thoroughly
>
> Your objective is to evaluate everything from the feature description including sub bullets that describes some functional aspect of the feature
>
> Write the functionality in the form of detailed Acceptance Criteria in a widely used format "As a (intended user), I want to (intended action), so that (goal/outcome of action)."
>
> Number the acceptance criteria and show one below the other.

LLM parameters 180 are settings for AI chatbot 150. In some embodiments, LLM parameters 180 include a "temperature" setting that controls randomness when AI chatbot 150 chooses words during text creation. The temperature setting may be any appropriate setting (e.g., a value between 0 and 1.0). In some embodiments, LLM parameters 180 include a "top_p" setting that controls how many words AI chatbot 150 considers. The top_p setting may be any appropriate setting (e.g., a value between 0 and 1.0). In some embodiments, LLM parameters 180 may include additional or alternate settings for AI chatbot 150 (e.g., a maximum token setting, a frequency penalty, a presence penalty, and the like).

In operation, APM AI system 100 utilizes APM AI tool 160 and AI chatbot 150 to review, analyze, and rewrite a manually-created APM user story 125. To do so, APM AI tool 160 may first access a particular APM user story 125 from memory 115 or agile management tool 120. APM AI tool 160 then accesses AI chatbot prompts 170 and LLM parameters 180 that may be stored in memory 115. Next, APM AI tool 160 electronically transmits APM user story 125, AI chatbot prompts 170, and LLM parameters 180 to AI chatbot 150 across network 140. In some embodiments, an API of AI chatbot 150 may be used to transmit APM user story 125 to AI chatbot 150. AI chatbot 150 generates APM AI response 155 according to APM user story 125, AI chatbot prompts 170, and LLM parameters 180 and transmits APM AI response 155 to computing system 110. APM AI tool 160 electronically receives APM AI response 155 across network 140 and displays APM AI response 155 on an electronic display (e.g., on client system 130).

In some embodiments, APM AI tool 160 additionally transmits the rewritten APM story 125 back to AI chatbot 150 along with additional AI chatbot prompts 170 that instruct AI chatbot 150 to generate a second APM AI response 155 based on the rewritten APM story 125. In some embodiments, the second APM AI response 155 includes a plurality of test cases for the rewritten APM story 125, a plurality of testing tips for the rewritten APM story 125, or acceptance criteria for the rewritten APM story 125. In some embodiments, APM AI tool 160 electronically receives, across a communications network, the second APM AI response 155 generated by AI chatbot 150 using the rewritten APM story 125 and displays the second APM AI response 155 generated by AI chatbot 150 on an electronic display (e.g., an electronic display of client system 130).

In some embodiments, APM AI tool 160 electronically transmits, to a client system such as client system 130, an alert 195 about APM AI response 155 generated by the AI chatbot. Alert 195 may include one or more of: an indication that the APM AI response is ready for review; an indication of the type of analysis performed on the APM user story (e.g., a review, a rewrite, etc.); a date/time that the APM AI response was generated; a title of the APM user story; and a link to view the APM AI response. As a result, the review/revise process of APM user stories 125 by the three amigos may be more efficient and may result in better testing coverage.

Figure 8:
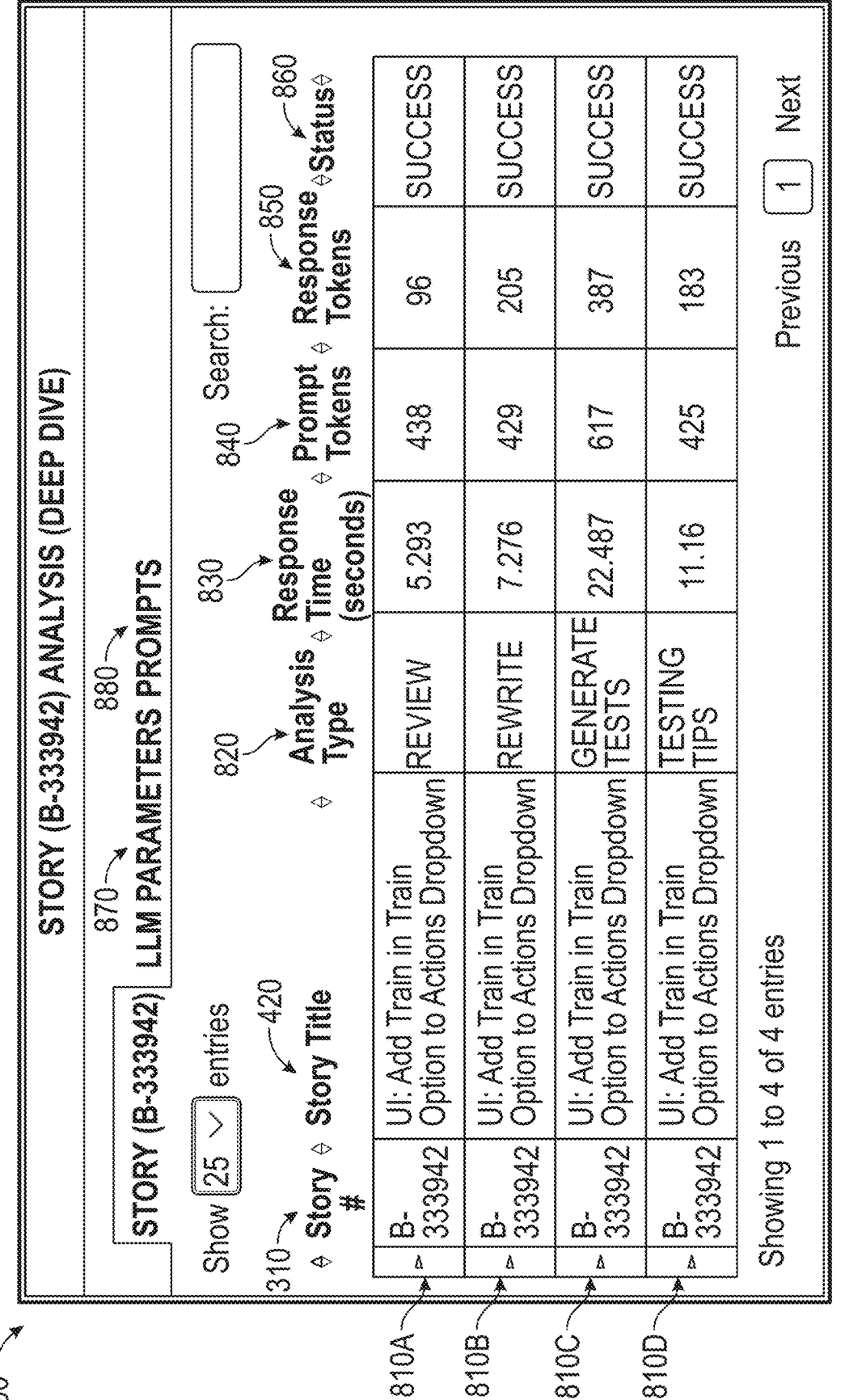
FIG. 8 illustrates an APM AI response interface that may be displayed by the APM AI system of FIG. 1, according to particular embodiments.

FIG. 8 illustrates an example APM AI response interface 190 that may be generated by APM AI tool 160 and displayed on client system 130, according to particular embodiments. In general, APM AI response interface 190 provides an interface to view APM user stories 125 and their associated APM AI responses 155, AI chatbot prompts 170, and LLM parameters 180. For example, as illustrated in FIG. 8, APM AI response interface 190 provides an interface to view APM AI responses 155 for APM user story "B-333942." Each row 810 of APM AI response interface 190 (e.g., rows 810A-810D) corresponds to a separate APM AI response 155 for APM user story B-333942 and includes a story ID 310, a rewritten story title 420, an analysis type 820, a response time 830, a number of prompt tokens 840, a number of response tokens 850, and a status 860. Analysis type 820 may be REVIEW, REWRITE, GENERATE TEST, TESTING TIPS, or ACCEPTANCE CRITERIA according to the type of APM AI response 155 (e.g., 155A-155E). Response time 830 indicates how long it took AI chatbot 150 to generate APM AI response 155. Number of prompt tokens 840 indicates how may prompt tokens were included in AI chatbot prompts 170 to generate APM AI response 155 from APM user story 125. Number of response tokens 850 indicates how may response tokens were need by AI chatbot 150 to generate APM AI response 155 from APM user story 125.

In some embodiments, elements within APM AI response interface 190 may be user-selectable in order to display additional information. For example, each row 810 (or any element within row 810) may be selected by a user to view the corresponding APM AI response 155. In addition, a user may select LLM Parameter tab 870 to view or edit the LLM parameters 180 that were used for the particular APM user story 125. Similarly, a user may select Prompts tab 880 to view or edit the AI chatbot prompts 170 that were used for the particular APM user story 125.

FIG. 9 is a chart illustrating a method 900 for using AI with APM, according to particular embodiments. In some embodiments, method 900 may be performed by APM AI tool 160 of APM AI system 100. At step 910, method 900 accesses an APM user story of a plurality of APM user stories stored in one or more memory units. In some embodiments, the APM user story is APM user story 125 stored in memory 115 or agile management tool 120. In some embodiments, the APM user story includes a user description of a unit of work to be performed.

At step 920, method 900 accesses a plurality of AI chatbot prompts. In some embodiments, the AI chatbot prompts are AI chatbot prompts 170 stored in memory 115. In some embodiments, the plurality of AI chatbot prompts instruct the AI chatbot to perform a review of the APM user story. In some embodiments, the plurality of AI chatbot prompts instruct the AI chatbot to perform a rewrite of the APM user story. In some embodiments, the plurality of AI chatbot prompts includes one or more instructions for the AI chatbot to assume a specific role, one or more instructions for the AI chatbot to give specific answers, and one or more instructions for the AI chatbot to give the specific answers in a specific format. In some embodiments, the plurality of AI chatbot prompts includes one or more exclusion criteria for the AI chatbot.

At step 930, method 900 accesses a plurality of LLM parameters. In some embodiments, the LLM parameters are LLM parameters 180 stored in memory 115. In some embodiments, the plurality of LLM parameters includes a temperature setting that controls randomness when the AI chatbot chooses words during text creation. In some embodiments, the plurality of LLM parameters includes a top_p setting that controls how many words the AI chatbot considers.

At step 940, method 900 electronically transmits, to an AI chatbot across a communications network, the APM user story, the plurality of AI chatbot prompts, and the LLM parameters of steps 910-930. In some embodiments, the AI chatbot is AI chatbot 150. In some embodiments, the communications network is network 140.

At step 950, method 900 electronically receives, across a communications network such as network 140, an APM AI response generated by the AI chatbot using the APM user story, the plurality of AI chatbot prompts, and the LLM parameters. In some embodiments, the APM AI response is APM AI response 155. In some embodiments, the APM AI response is a review analysis that includes a plurality of suggestions for improving the APM user story and a rating score that indicates a quality of the APM user story. In some embodiments, the APM AI response is a rewritten APM user story (i.e., an AI generated story based on the original APM user story).

At step 960, method 900 displays the APM AI response generated by the AI chatbot in step 950 on an electronic display. In some embodiments, the APM AI response is displayed in a user interface 132 on an electronic display of client system 130. After step 960, method 900 may end.

In some embodiments, method 900 additionally includes electronically transmitting, to the AI chatbot across a communications network, the rewritten APM story generated by the AI chatbot. In some embodiments, method 900 may additionally electronically send additional AI chatbot prompts that instruct the AI chatbot to generate a second APM AI response based on the rewritten APM story. In some embodiments, the second APM AI response includes a plurality of test cases for the rewritten APM story, a plurality of testing tips for the rewritten APM story, or acceptance criteria for the rewritten APM story. In some embodiments, method 900 additionally includes electronically receiving, across a communications network, the second APM AI response generated by the AI chatbot using the rewritten APM story. In some embodiments, method 900 additionally includes displaying the second APM AI response generated by the AI chatbot on an electronic display (e.g., an electronic display of client system 130). In some embodiments, method 900 additionally includes electronically transmitting, to a client system such as client system 130, an alert about the APM AI response generated by the AI chatbot. The alert may include one or more of: an indication that the APM AI response is ready for review; an indication of the type of analysis performed on the APM user story (e.g., a review, a rewrite, etc.); a date/time that the APM AI response was generated; a title of the APM user story; and a link to view the APM AI response.

Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method including the particular steps of the method of FIG. 9, this disclosure contemplates any suitable method including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 10:
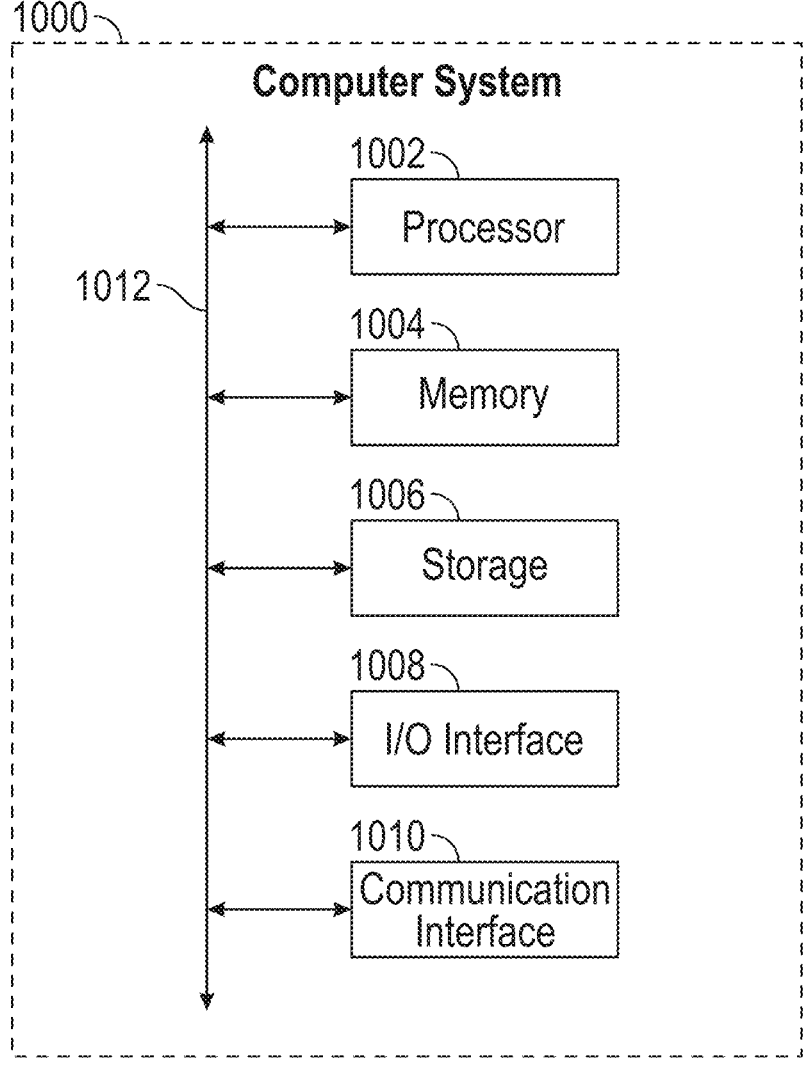
FIG. 10 is an example computer system that can be utilized to implement aspects of the various technologies presented herein, according to particular embodiments.

FIG. 10 illustrates an example computer system 1000 that can be utilized to implement aspects of the various methods and systems presented herein, according to particular embodiments. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example, and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example, and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example, and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example, and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example, and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example, and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

Moreover, the description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "member," "module," "device," "unit," "component," "element," "mechanism," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the disclosures can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

The invention claimed is:

1. A system comprising:
  one or more memory units configured to store:
    a plurality of agile project management (APM) user stories, each APM user story of the plurality of APM user stories comprising a user description of a unit of work;
    a plurality of artificial intelligence (AI) chatbot prompts, wherein the plurality of AI chatbot prompts comprises:
      one or more instructions for an AI chatbot to assume a specific role;
      one or more instructions for the AI chatbot to give specific answers; and
      one or more instructions for the AI chatbot to give the specific answers in a specific format; and
    a plurality of large language model (LLM) parameters;
  one or more computer processors communicatively coupled to the one or more memory units and configured to execute machine-readable instructions, wherein the configuration of the one or more computer processors to execute the machine-readable instructions includes configuration to spawn more than one computer process concurrently, wherein the concurrent more than computer processes are configured to execute the machine-readable instructions to concurrently process data to perform program steps comprising:

access an APM user story of the plurality of APM user stories;

access the plurality of AI chatbot prompts and the plurality of LLM parameters, wherein the plurality of AI chatbot prompts instruct the AI chatbot to perform a rewrite of the APM user story;

electronically transmit, to the AI chatbot across a communications network, the APM user story, the plurality of AI chatbot prompts, and the LLM parameters;

electronically receive, across the communications network, an APM AI response generated by the AI chatbot using the APM user story, the plurality of AI chatbot prompts, and the LLM parameters; and display the APM AI response generated by the AI chatbot on an electronic display, wherein the APM AI response is a rewritten APM user story.

2. The system of claim 1, wherein:
the plurality of AI chatbot prompts instruct the AI chatbot to perform a review of the APM user story; and
the APM AI response is a review analysis that comprises:
a plurality of suggestions for improving the APM user story; and
a rating score that indicates a quality of the APM user story.

3. The system of claim 1, the one or more computer processors further configured to:
electronically transmit, to the AI chatbot across the communications network, the rewritten APM story generated by the AI chatbot and additional AI chatbot prompts that instruct the AI chatbot to generate a second APM AI response, the second APM AI response comprising:
a plurality of test cases for the rewritten APM story;
a plurality of testing tips for the rewritten APM story; or
acceptance criteria for the rewritten APM story;
electronically receive, across the communications network, the second APM AI response generated by the AI chatbot using the rewritten APM story; and
display the second APM AI response generated by the AI chatbot on the electronic display.

4. The system of claim 1, wherein the plurality of AI chatbot prompts further comprises one or more exclusion criteria for the AI chatbot.

5. The system of claim 1, wherein the plurality of LLM parameters comprises:
a temperature setting that controls randomness when the AI chatbot chooses words during text creation; and
a top_p setting that controls how many words the AI chatbot considers.

6. A method by a computing system for using artificial intelligence (AI) with agile project management (APM), the method comprising:
spawning more than one computer process concurrently, wherein the concurrent more than computer processes are configured to execute machine-readable instructions to concurrently process data to perform the steps of the method;
accessing an APM user story of a plurality of APM user stories stored in one or more memory units, each APM user story of the plurality of APM user stories comprising a user description of a unit of work;

accessing a plurality of artificial intelligence (AI) chatbot prompts stored in the one or more memory units, wherein the plurality of AI chatbot prompts comprises:
one or more instructions for an AI chatbot to assume a specific role;
one or more instructions for the AI chatbot to give specific answers; and
one or more instructions for the AI chatbot to give the specific answers in a specific format;

accessing a plurality of large language model (LLM) parameters stored in the one or more memory units, wherein the plurality of AI chatbot prompts instruct the AI chatbot to perform a rewrite of the APM user story;

electronically transmitting, to the AI chatbot across a communications network, the APM user story, the plurality of AI chatbot prompts, and the LLM parameters;

electronically receiving, across the communications network, an APM AI response generated by the AI chatbot using the APM user story, the plurality of AI chatbot prompts, and the LLM parameters; and displaying the APM AI response generated by the AI chatbot on an electronic display, wherein the APM AI response is a rewritten APM user story.

7. The method of claim 6, wherein:
the plurality of AI chatbot prompts instruct the AI chatbot to perform a review of the APM user story; and
the APM AI response is a review analysis that comprises:
a plurality of suggestions for improving the APM user story; and
a rating score that indicates a quality of the APM user story.

8. The method of claim 6 further comprising:
electronically transmitting, to the AI chatbot across the communications network, the rewritten APM story generated by the AI chatbot and additional AI chatbot prompts that instruct the AI chatbot to generate a second APM AI response, the second APM AI response comprising:
a plurality of test cases for the rewritten APM story;
a plurality of testing tips for the rewritten APM story; or
acceptance criteria for the rewritten APM story;
electronically receiving, across the communications network, the second APM AI response generated by the AI chatbot using the rewritten APM story; and
displaying the second APM AI response generated by the AI chatbot on the electronic display.

9. The method of claim 6, further comprising electronically transmitting, to a client system, an alert about the APM AI response generated by the AI chatbot.

10. The method of claim 6, wherein the plurality of LLM parameters comprises:
a temperature setting that controls randomness when the AI chatbot chooses words during text creation; and
a top_p setting that controls how many words the AI chatbot considers.

11. One or more computer-readable non-transitory storage media embodying instructions that, when executed by a processor, cause the processor to perform operations comprising:
spawning more than one computer process concurrently, wherein the concurrent more than computer processes are configured to execute machine-readable instructions to concurrently process data to perform the operations;

accessing an APM user story of a plurality of APM user stories stored in one or more memory units, each APM user story of the plurality of APM user stories comprising a user description of a unit of work;

accessing a plurality of artificial intelligence (AI) chatbot prompts stored in the one or more memory units, wherein the plurality of AI chatbot prompts comprises:

one or more instructions for an AI chatbot to assume a specific role;

one or more instructions for the AI chatbot to give specific answers; and one or more instructions for the AI chatbot to give the specific answers in a specific format;

accessing a plurality of large language model (LLM) parameters stored in the one or more memory units, wherein the plurality of AI chatbot prompts instruct the AI chatbot to perform a rewrite of the APM user story;

electronically transmitting, to the AI chatbot across a communications network, the APM user story, the plurality of AI chatbot prompts, and the LLM parameters;

electronically receiving, across the communications network, an APM AI response generated by the AI chatbot using the APM user story, the plurality of AI chatbot prompts, and the LLM parameters; and displaying the APM AI response generated by the AI chatbot on an electronic display, wherein the APM AI response is a rewritten APM user story.

12. The one or more computer-readable non-transitory storage media of claim 11, wherein:

the plurality of AI chatbot prompts instruct the AI chatbot to perform a review of the APM user story; and the APM AI response is a review analysis that comprises:

a plurality of suggestions for improving the APM user story; and a rating score that indicates a quality of the APM user story.

13. The one or more computer-readable non-transitory storage media of claim 11, the operations further comprising:

electronically transmitting, to the AI chatbot across the communications network, the rewritten APM story generated by the AI chatbot and additional AI chatbot prompts that instruct the AI chatbot to generate a second APM AI response, the second APM AI response comprising:

a plurality of test cases for the rewritten APM story;

a plurality of testing tips for the rewritten APM story; or acceptance criteria for the rewritten APM story;

electronically receiving, across the communications network, the second APM AI response generated by the AI chatbot using the rewritten APM story; and displaying the second APM AI response generated by the AI chatbot on the electronic display.

14. The one or more computer-readable non-transitory storage media of claim 11, wherein the plurality of LLM parameters comprises:

a temperature setting that controls randomness when the AI chatbot chooses words during text creation; and a top_p setting that controls how many words the AI chatbot considers.

* * * * *